(12) United States Patent
Bell et al.

(10) Patent No.: US 6,321,309 B1
(45) Date of Patent: Nov. 20, 2001

(54) MEMORY ARBITRATION SCHEME WITH CIRCULAR SEQUENCE REGISTER

(75) Inventors: Peter Bell, Surrey; John Massingham; Alex Darnes, both of Oxon, all of (GB)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/314,655

(22) Filed: May 19, 1999

(30) Foreign Application Priority Data

May 19, 1998 (GB) ................................................ 9810773

(51) Int. Cl.$^7$ ....................................................... G06F 12/00
(52) U.S. Cl. ........................... 711/150; 711/151; 711/152; 710/40; 710/111; 710/244
(58) Field of Search ........................... 711/150–152, 158; 710/40, 111, 244

(56) References Cited

U.S. PATENT DOCUMENTS

| 4,400,771 | 8/1983 | Suzuki et al. . |
|---|---|---|
| 5,303,382 | 4/1994 | Buch et al. . |
| 6,178,486 | * 1/2001 | Gill et al. .............................. 711/151 |

FOREIGN PATENT DOCUMENTS 1377557   12/1974   (GB) .

* cited by examiner

Primary Examiner—Matthew Kim
Assistant Examiner—Pierre M. Vital
(74) Attorney, Agent, or Firm—Westman Champlin & Kell PA

(57) ABSTRACT

Apparatus for arbitrating between requests from a plurality of sources for access to a shared resource, the apparatus comprising:

a register means having a plurality of stages, each stage containing a designation of one of said sources, a plurality of stages containing a designation of the same source, logic means for accessing the register stages according to a priority scheme and for comparing the designation in each stage with requests for access, and granting access according to the match between the highest priority source designation and a memory request, and means for changing the contents of the register means subsequent to access grant.

8 Claims, 2 Drawing Sheets

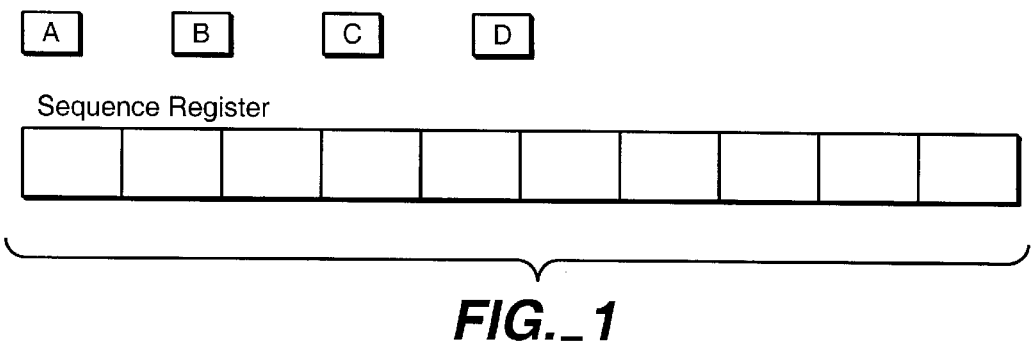
FIG._1
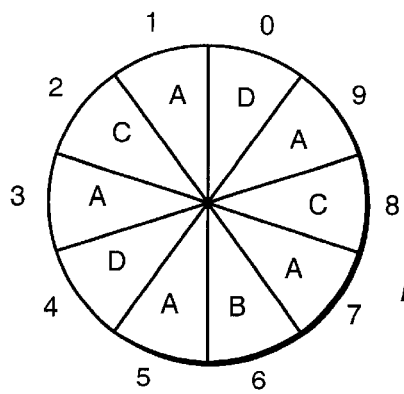
FIG._2
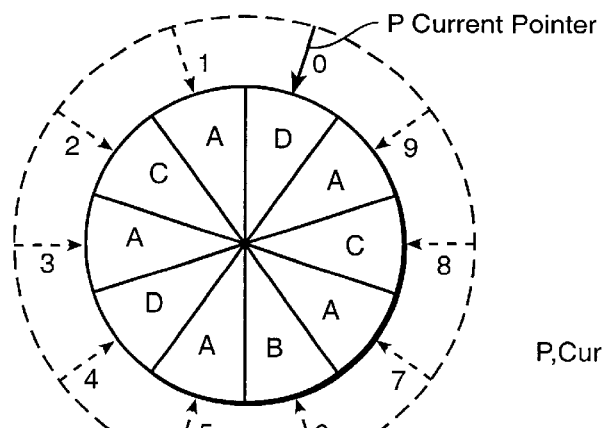
FIG._3
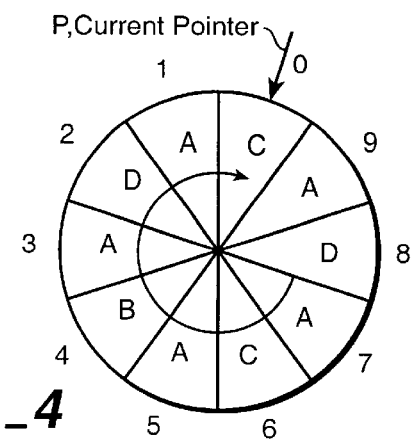
FIG._4

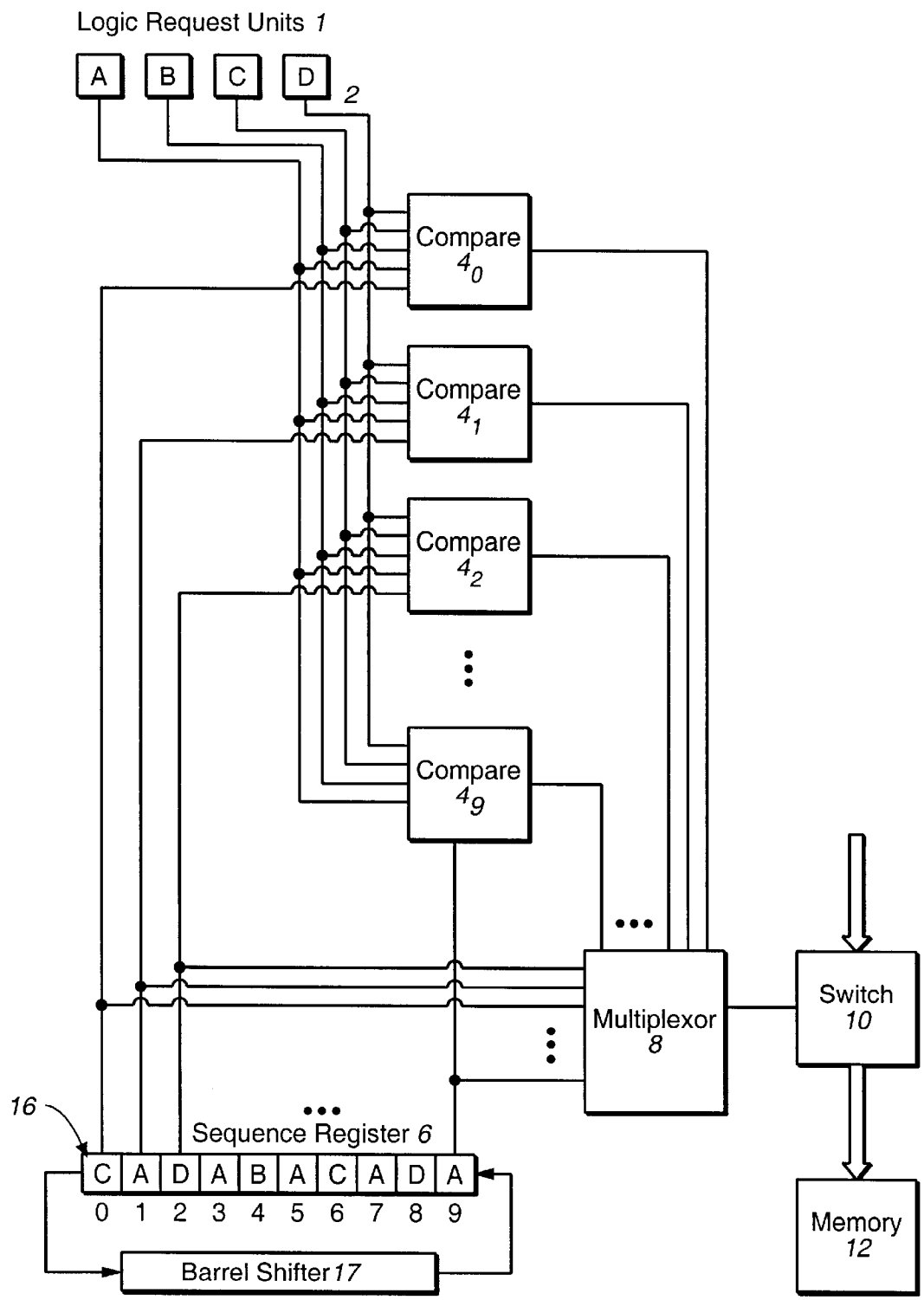
FIG._5

MEMORY ARBITRATION SCHEME WITH CIRCULAR SEQUENCE REGISTER

BACKGROUND OF THE INVENTION

The present invention relates to a method and apparatus for arbitrating between requests from various sources for access to a shared resource, particularly, although not exclusively, memory in a computer system.

Known arbitration schemes for memory access frequently operate on the basis of granting access to the first received request or according to a fixed priority scheme wherein a request from one source always has priority over a request from another source.

The primary problem with such schemes is that, when incorporated in an integrated circuit, they cannot thereafter be changed. Further, they are inflexible in the sense that they do not take account of whereas some sources may be accorded a high priority but only require a small amount of memory, other sources with another priority may have a need for a greater number of memory accesses, i.e. a greater memory "bandwidth". It is an object of the present invention to overcome or at least reduce these problems.

SUMMARY OF THE INVENTION

The present invention provides apparatus for arbitrating between requests from a plurality of sources for access to a shared resource, the apparatus comprising:

a register means having a plurality of stages, each stage containing a designation of one of said sources, a plurality of stages containing a designation of the same source, logic means for accessing the register stages according to a priority scheme and for comparing the designation in each stage with requests for access, and granting access according to the match between the highest priority source designation and a memory request, and means for changing the contents of the register means subsequent to access grant.

The register means comprises a sequence register or circulating register, which cyclically rotates the contents of the register through the stages, so that when a source designation reaches the last stage in the register, it is then rotated back to the first stage in the register.

Conveniently, the logic means will compare the contents of the register with the received memory requests; if one or more matches are achieved, access is granted to the stage with the highest priority. The register stage therefore represents the highest priority access, which changes dynamically as the register is rotated.

Thus, the advantage of such an arrangement is that the priority scheme can be selectively programmed. Furthermore, if a particular source has a large memory bandwidth requirement, then more register stages may contain a designation of this source as opposed to other sources; other sources may however have a higher priority at any given point in time. The priority scheme can be changed dynamically by changing the contents of the register.

In a further aspect, the present invention provides a method for arbitrating between requests from a plurality of sources for access to a shared resource, comprising:

providing a register means with a plurality of stages, and designating within each of said stages one of said sources, and designating in a plurality of stages the same source, and accessing the stages according to a fixed priority scheme to compare the designation in the stage with requests for access from said sources, and granting access according to the designations within the register stages, and changing the contents of the registers subsequent to access grant.

BRIEF DESCRIPTION OF THE DRAWINGS

FIGS. 1 and 2 are conceptual views of a sequence register for use in the present invention;

FIGS. 3 and 4 are view similar to FIG. 2 but with the addition of a pointer for accessing the contents of the register; and FIG. 5 is a block diagram of a preferred embodiment of the invention.

DETAILED DESCRIPTION OF ILLUSTRATIVE EMBODIMENTS

This invention provides a programmable arbitration mechanism for handling multiple access to a shared resource (in this case memory). These accesses have to be scheduled quickly (within a single cycle) and a priority scheme must dictate the amount of memory bandwidth accessible to each "requester" (eg. CPU, video decoder, preparser). In outline there is a sequence register as shown in FIG. 1 which contains the designation (ID number) of a particular unit that can make a request. Consider a system for example with four request units (A,B,C,D) and a sequence register wide enough for 10 access "slots", as shown in FIG. 1.

The ID of each request unit can now be placed in the sequence register. Supposing "A" has a requirement for a high memory bandwidth and "B" a low memory bandwidth, then more access slots can be allocated to "A". Consider, as shown in FIGS. 2 and 3, this register to be circular for ease of explanation. As shown in FIG. 3, a current access pointer, P, indicates the unit that currently has access to the shared resource (memory). "Look ahead logic" scans the sequence register in priority order, starting from the next location as indicated by P+1, searching for the next designation that matches a unit currently requesting access to the shared resource. Upon detection of a request, the sequence register is rotated such that point, P, now identified the new unit which is to be granted access to said shared resource. Once the current request has terminated and providing the next request has been detected then the request is acknowledged and the process can be repeated.

Supposing "C" made a request starting from the configuration as depicted in FIG. 3 then once "D" has been serviced, request "C" is acknowledged and the sequence register is rotated to the next configuration as depicted in FIG. 4. Supposing that there are a multiple of requests detected by look ahead logic then the priority scheme is such that slot 0 has the highest priority and slot 9 the lowest. This ensures that every unit at some stage becomes the highest priority unit. The maximum delay before a unit is granted access to memory can therefore be calculated from the time it takes the sequence register to make one revolution. This duration is determined by the length of the sequence register and the time required to service the longest memory access. If this is too long then the ordering of the sequence register can be reprogrammed accordingly. By making the sequence register writable, then this can even be done post silicon by say an embedded CPU in an ASIC. The bandwidth associated with each unit can be calculated from the length of the sequence register divided by the number of occurrences of a unit within that sequence register. For the example above A has 50% bandwidth and B has 10%. The granulating can be made finer by making the sequence register bigger e.g. 32 slots. If during verification/usage is either pre or post silicon, the bandwidth requirements need to be adjusted then this can be done as described above.

FIG. 5 shows a block diagram of an embodiment of the invention comprising sources A, B, C, D making memory requests on lines 2 to a number of comparators $4_0$, $4_9$. The second inputs to the comparators are from respective stages of a sequence register 6; these inputs are also inputs to a multiplexor 8. The comparator results are used as select lines for this multiplexor 8. The decode logic of the multiplexor is organised such that the priority inherent within the sequence register is maintained at the output of the multiplexor by means of the inputs direct from register 6. So for example, if the output from comparator number $4_0$ was high, then the multiplexor would pass the input from this comparator to is output. The output of the multiplexor is coupled to a memory access switch 10 which provides selective access of the address, data and control lines to memory store 12.

The sequence shift register 6 has in this example, register stages 16, each containing an identification number which may be one of the four requesting units named A,B,C,D. Thus, in this example, each register stage comprises two bits. Ten register stages are provided and the contents of the register are shifted from the last stage 9 to the first stage 0 by means of a barrel shifter 17. A pointer indicating the highest priority within the sequence register is comprised of look ahead logic comprising comparators 4 and multiplexor 8.

It should be noted that the look ahead logic does not necessarily have to encompass the whole plurality of stages with the sequence register. A partial look ahead can be implemented to save silicon area, cost, power and design complexity. In this case, if no units are actually requesting memory access within a given cycle then the sequence register should be rotated. This is required to prevent "lock up" whereby a requesting module outside of the look ahead region will never be serviced.

Thus, in operation at the beginning of a cycle, current memory requests are made from units A, D, C, D to comparators 4. The contents of the register stages 16 are compared in comparators 4 with the logic requests. Register stage 0 contains the identification number of the highest priority source. This is compared in comparator $4_0$ and if this source, say C is making a request, then aces will be granted to source C to memory 12 by means of switch 10. If however source C is not making a request, then the contents of the register stage 1 are compared in comparator $4_1$, to provide a memory access if unit A is making a request. The entire contents of the shift register can be accessed and compared within one processor cycle.

It will be appreciated that the contents of the register may simply be reprogrammed by providing suitable access lines to a processor within the integrated circuit or to external interface lines. The arbitration scheme according to the invention has various advantages, in particular that it is reprogrammable and that there is no redundancy in handling requests.

Thus, the register is rewritable to allow a post silicon modification, which provides the advantage of avoiding the need for modification of an integrated circuit to adjust bandwidth problems for shared resources.

Although the present invention has been described with reference to preferred embodiments, workers skilled in the art will recognize that changes may be made in form and detail without departing from the spirit and scope of the invention.

What is claimed is:

1. Apparatus for arbitrating between requests for access to a shared resource, the apparatus comprising:

a plurality of request inputs, wherein each request input comprises a source designation and indicates whether that source is requesting access to the shared resource;

a circular sequence register having a plurality of successive stages with respective, successively decreasing priorities, wherein each source designation is stored in a selected number of the stages that is based on a relative access bandwidth requirement for that source;

logic means for comparing the source designations stored in the successive stages with the plurality of request inputs to identify a set of the stages that store designations of sources that are requesting access and for granting access to the source designation that is stored in the highest priority stage within the set; and shifting means for shifting all of the source designations in a common direction within the sequence register after the logic means grants access.

2. The apparatus according to claim 1, wherein the logic means comprises a series of comparators, each comparator being arranged for comparing the source designation within a respective register stage with the request inputs and to provide an output signal indicating a match between the source designation and one of the request inputs if that request input indicates that the source is requesting access to the shared resource.

3. The apparatus according to claim 2, wherein:

the logic means further comprises multiplexer means having a plurality of multiplexer select inputs coupled to respective ones of the output signals from the series of comparators and a plurality of inputs coupled to respective ones of the sequence register stages.

4. The apparatus according to claim 3 wherein the shifting means comprises means for shifting all of the source designations that are stored in the sequence register in the common direction based on the priority of the stage of the source designation that was granted access by the logic means.

5. The apparatus according to claim 4, wherein the shifting means comprises a barrel shifter.

6. A method for arbitrating between requests for access to a shared resource, comprising:

receiving a plurality of request inputs, wherein each request input comprises a source designation and indicates whether that source is requesting access to the shared resource;

providing a circular sequence register having a plurality of successive stages with respective, successively decreasing priorities;

storing each source designation in a selected number of the stages that is based on a relative access bandwidth requirement for that source;

comparing the source designations stored in the successive stages with the plurality of request inputs to identify a set of the stages that store designations of sources that are requesting access and for granting access to the source designation that is stored in the highest priority stage within the set; and shifting all of the source designations in a common direction within the sequence register after the granting access.

7. The method of claim 6 wherein the step of storing comprises storing at least one of the source designations in more than one of the stages.

8. The apparatus according to claim 1, wherein at least one of the source designations is stored in more than one of the stages.

* * * * *